United States Patent [19]
Davis et al.

[11] Patent Number: 5,808,709
[45] Date of Patent: Sep. 15, 1998

[54] ILLUMINATOR WITH POLARIZATION SEPARATING ANISOTROPIC LAYER BETWEEN LIGHT GUIDE AND REFLECTOR

[75] Inventors: Gillian Margaret Davis, Cambridge; Duncan James Anderson, Oxfordshire, both of United Kingdom

[73] Assignee: Sharp Kabushiki Kaisha, Osaka, Japan

[21] Appl. No.: 734,076

[22] Filed: Oct. 21, 1996

[30] Foreign Application Priority Data

Oct. 24, 1995 [GB] United Kingdom ............... 9521789

[51] Int. Cl.⁶ .................. G02F 1/1335; F21V 9/14; F21V 3/00; G01D 11/28
[52] U.S. Cl. .................. 349/65; 349/98; 362/19; 362/26; 362/311
[58] Field of Search .................. 349/65, 9, 117, 349/98; 362/19, 26, 31, 299, 300, 301, 307, 311

[56] References Cited

U.S. PATENT DOCUMENTS

| | | | |
|---|---|---|---|
| 4,212,048 | 7/1980 | Castleberry | 362/19 |
| 4,616,295 | 10/1986 | Jewell et al. | 362/31 |
| 4,798,448 | 1/1989 | van Raalte | 350/345 |
| 5,235,443 | 8/1993 | Barnik et al. | 359/37 |
| 5,295,009 | 3/1994 | Barnik et al. | 359/65 |
| 5,303,322 | 4/1994 | Winston et al. | 385/146 |
| 5,587,816 | 12/1996 | Gunjima et al. | 349/9 |

FOREIGN PATENT DOCUMENTS

| | | |
|---|---|---|
| 0428213 | 5/1991 | European Pat. Off. . |
| 0467447 | 1/1992 | European Pat. Off. . |
| 0492636 | 7/1992 | European Pat. Off. . |
| 0573905 | 12/1993 | European Pat. Off. . |
| 0634674 | 1/1995 | European Pat. Off. . |
| 6-59261 | 3/1994 | Japan ............ 349/65 |
| 94/11776 | 5/1994 | WIPO . |
| 95/17692 | 6/1995 | WIPO . |
| 95/17699 | 6/1995 | WIPO . |

OTHER PUBLICATIONS

M. Schadt et al., Japanese Journal of Applied Physics, vol. 29, No. 10, pp. 1974–1984, 1990 "New Liquid Crystal Polarized Color Projection Principle".

C.Y. Tai et al., SID 94 Applications Digest, pp. 10–13, 1994, "A1.3: Flat Collimator: A Backlighting Assembly Utilizing Microprisms for High Energy Efficiency".

*Primary Examiner*—Anita Pellman Gross

[57] ABSTRACT

An illuminator includes a light guide in the form of a light pipe, one surface of which is provided with a polarization separating layer in the form of an anisotropic layer for separating substantially all of the light of one polarization from the orthogonal polarization component. The anisotropic layer is provided between the light pipe and a reflector. The layer has a first refractive index greater than or equal to that of the light pipe and a second refractive index less than that of the light pipe.

17 Claims, 3 Drawing Sheets

ILLUMINATOR WITH POLARIZATION SEPARATING ANISOTROPIC LAYER BETWEEN LIGHT GUIDE AND REFLECTOR

This invention relates to an illuminator, for example to an illuminator suitable for use with a liquid crystal display.

Liquid crystal displays (LCDs) require polarized illumination systems. Thus when using a conventional fluorescent tube and light pipe arrangement to illuminate an LCD, a polarizer is required. The polarizer absorbs one polarization component of the light incident thereon and transmits the orthogonal component. Such polarizers therefore absorb at least 50% of the light incident thereon and hence illumination systems using such polarizers are inefficient.

In order to improve the efficiency of such systems, polarizers have been designed which convert one polarization component to match the polarization of the orthogonal component. Such arrangements are described in EP 0428213 and EP 0467447 and comprise polarization sensitive beam splitters including a layer of birefringent material. These arrangements are relatively bulky and so are suitable only for use in projection display systems.

U.S. Pat. No. 4,798,448 describes an arrangement in which a birefringent medium is arranged to separate two orthogonal components of plane polarized light from one another. A patterned half wave plate is arranged so that substantially all of one component falls on regions of the plate which do not alter the polarization of light incident thereon whereas the other component is incident upon regions which rotate the axis of polarization by 90° so as to match the polarization of the first component. The light emitted by this arrangement is of substantially uniform polarization, but the arrangement has the disadvantage of being relatively bulky.

Further arrangements for producing light of substantially uniform polarization are described in the Japanese Journal of Applied Physics 29, 1974, 1990, in U.S. Pat. No. 5,295,009 and in EP 0634674. These arrangements use cholesteric liquid crystal polymers to transmit one handedness of circular polarization and reflect the other handedness. The reflected handedness is incident upon a mirror which alters the polarization of light incident thereon so as to be able to be transmitted by the cholesteric liquid crystal polymer material.

EP 0 573 905 discloses a retro-reflecting polariser for use in overhead projectors. The polariser is located between a projection light source and a liquid crystal spatial light modulator and passes one linear polarisation while reflecting the orthogonal polarisation. There is a mention of recycling the reflected light but no details are given.

EP 0 492 636 disclosed a polarised light source for a projector. A polarising surface is disposed within a polarisation beam splitter and divides light from a light source into two orthogonally polarised components. A first component is reflected out of the splitter whereas a second component is reflected back towards the light source. The second component passes through a quarter waveplate and is reflected by a reflector behind the lamp so as to pass back through the quarter waveplate. The polarisation vector of the second component is thus rotated through 90 degrees and is reflected out of the splitter with the first component.

U.S. Pat. No. 4,212,048 discloses a front light for a reflective dichroic liquid crystal display comprising a light guide with a light source near its edge. A polariser is embedded within the light guide so as to pass a linearly polarised component of light from the light source. This component is guided along and out of the light guide so as to illuminate the display from the front.

WO94/11776, WO95/17692 and WO95/17699 discloses a multiple layer reflective polariser disposed between an optical cavity and a liquid crystal display. The polariser comprises a multilayer sandwich of alternate layers of birefringent and isotropic materials. The sandwich comprises many layers, possibly many hundreds of layers, and so is difficult to manufacture. Operation is based on multiple reflectors at each interface of the sandwich to separate two orthogonal polarisations.

According to the invention, there is provided an illuminator as defined in the appended claim 1.

Preferred embodiments of the invention are defined in the other appended claims.

The purpose of the polarisation separating layer is to separate the majority of one polarisation state from the orthogonal state but polarization separating layer is unlikely to be totally effective. In practice, most of one polarisation state is transmitted by the layer, a relatively small proportion being reflected. Similarly, for the other, orthogonal, polarisation state, most of the state is reflected, a relatively small proportion being transmitted.

The use of a patterned anisotropic layer permits the second polarization component to be emitted from the illuminator. A polarization rotator or retarder is conveniently arranged to convert the polarization of the light of the second component to match that of the first component, such an arrangement permits substantially all of the light to be used to illuminate an LCD.

The use of an anisotropic layer to separate the polarization components permits the illuminator to be compact compared to most previously known arrangements.

The invention will further be described, by way of example, with reference to the accompanying drawings, in which.

Figure 1:
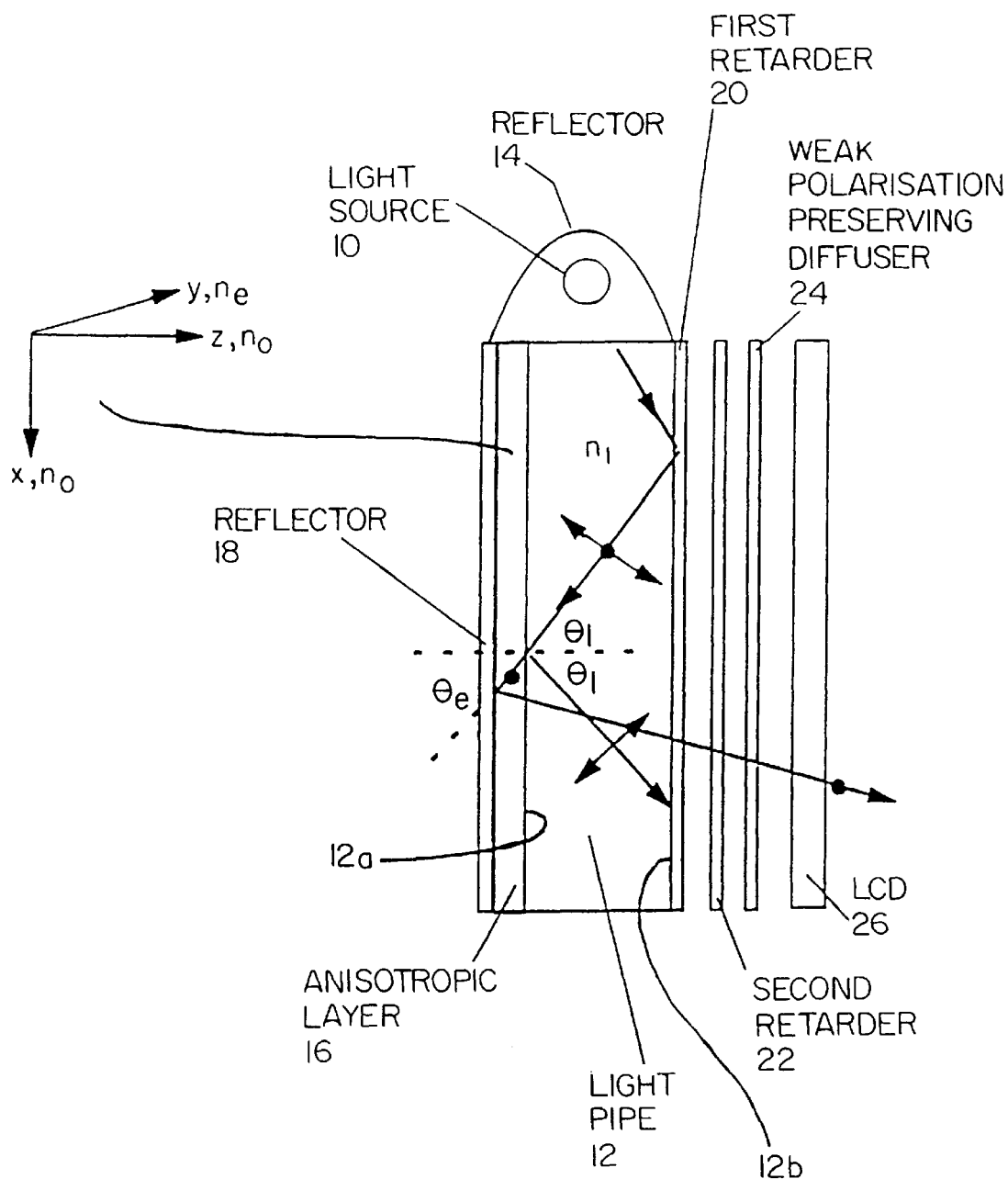
FIG. 1 is a diagrammatic view of an illuminator constituting a first embodiment of the invention used in conjunction with a liquid crystal display.

The illuminator illustrated in FIG. 1 comprises a light source 10 in the form of a fluorescent tube coupled to a light pipe 12. A reflector 14 is positioned behind the light source 10 in order to reflect substantially all of the light emitted by the light source 10 towards the light pipe 12.

The light pipe 12 includes a first surface 12a upon which an anisotropic layer 16 is provided. A reflector 18 is positioned adjacent the anisotropic layer 16 so as to reflect light transmitted by the anisotropic layer 16 back through the anisotropic layer 16 and the light pipe 12.

A second surface 12b of the light pipe 12 is provided with a first retarder 20, adjacent which a second retarder 22 and a weak polarization preserving diffuser 24 are provided. The light transmitted by the weak polarization preserving diffuser 24 is incident upon a liquid crystal display 26. The first and second retarders 20, 22 conveniently comprise layers of anisotropic material arranged such that their combined effect upon light transmitted by both layers is negligible, the second retarder 22 substantially compensating for the effect of the first retarder 20.

The anisotropic layer 16 is arranged with its optic axis extending into the plane of FIG. 1, and is made of a material having an extraordinary refractive index larger than or equal to the refractive index of the light pipe 12. The ordinary refractive index of the anisotropic material of the layer 16 is less than the refractive index of the light pipe 12.

In use, unpolarized light from the light source 10 is incident upon the interface between the light pipe 12 and the anisotropic layer 16. Substantially all of the component of the unpolarized light having a polarization normal to the plane of the paper, denoted by a dot in FIG. 1, passes through the interface between the light pipe 12 and the anisotropic layer 16 and is reflected by the reflector 18. The reflector 18 preferably preserves the polarization of the light incident thereon but is arranged to change the angle of the light reflected thereby so that when it is returned through the light pipe 12, the light is transmitted through the first retarder 20, the second retarder 22, the weak polarization preserving diffuser 24 and the liquid crystal display 26. The change in angle of the light may be achieved by providing, for example, a diffuse, faceted, or prismatic specular reflecting surface on the reflector 18.

Because the refractive index of the light pipe 12 is equal to the extraordinary refractive index of the anisotropic layer 16, substantially no light of the component denoted by the dot in FIG. 1 is reflected at the boundary between the light pipe 12 and the anisotropic layer 16. Thus substantially all of the light of this component is reflected by the reflector 18 and transmitted towards the liquid crystal display 26.

Light of the second orthogonal component denoted by double-headed arrows in FIG. 1 suffers total internal reflection at the boundary between the light pipe 12 and the anisotropic layer 16 due to the refractive index of the light pipe 12 being less than the ordinary refractive index of the anisotropic layer 16. The light of this component is therefore not incident upon the reflector 18 and so is not reflected towards the liquid crystal display 26.

If the refractive index $n_1$ of the light pipe 12 is 1.58, and the anisotropic layer 16 has an ordinary refractive index $n_0$ of 1.48 and an extraordinary refractive index $n_0$ of 1.58, then for the component polarized in the plane of FIG. 1 (denoted by the double-headed arrows in FIG. 1), applying Snell's Law gives:

$$n_1 \sin\theta_1 = n_0 \sin\theta_0$$

Since $n_1$ is greater than $n_0$, for $\theta_1$ greater than the critical angle $\theta_r$, all of the light of this component is reflected at the boundary between the light pipe 12 and the anisotropic layer 16.

For the other component (denoted by the dot in FIG. 1), $$n_1 \sin\theta_1 = n_e \sin\theta_e$$

Because $n_1 = n_e$, and $\theta_1 = \theta_e$, the light of this component passes directly into the anisotropic layer 16 without deviating from it original direction.

The light pipe 12 is likely to be slightly anisotropic and hence, as the light bounces along the light pipe 12, polarization conversion occurs. Thus, eventually substantially all of the light of the second component is converted to light of the first polarization component and is reflected out of the light pipe by the reflector 18. The first retarder 20 of an anisotropic material increases this effect, so that the light pipe 12 and the first retarder 20 eventually convert the polarization of the second component to match that of the first component. The second retarder 22 takes the form of an additional thin film of anisotropic material of the opposite orientation to the first retarder 20, and is placed after the light pipe 12 in order to negate the effect of the first retarder 20 and ensure that the liquid crystal display 26 is illuminated by light of the appropriate polarization.

Alternatively, if the first retarder 20 takes the form of a quarter wave plate arranged to illuminate the liquid crystal display 26 with circularly polarized light, the second retarder 22 may be omitted, the first retarder 20 still performing a polarization converting function.

If the light pipe is made of polycarbonate with a refractive index of 1.58 as described above, the maximum grazing angle at the interface with the anisotropic layer 16 is approximately 39°. To ensure that all of the light of the polarization component denoted by the double-headed arrow in FIG. 1 is reflected at the interface between the light pipe 12 and the anisotropic layer 16, it is desirable for the grazing angle to be as small as possible. In the above described example, the ordinary refractive index $n_0$ is 1.48, resulting in a maximum grazing angle for total internal reflection of approximately 20°. It will therefore be understood that an arrangement is preferable for reducing the maximum input grazing angle of the light transmitted into the light pipe 12. One suitable technique for reducing the maximum input angle is to shape the input edge of the light pipe 12 into a wedge 30 (see FIG. 3). It has been found that a wedge angle of approximately 5°, an input width 3 mm and a wedge length of 11 mm are sufficient to reduce the maximum input grazing angle to approximately 20°. A suitable technique is described in SID International Symposium, Digest of Papers, A1.3, 1994.

The anisotropic layer 16 may comprise a film of a liquid crystal polymer or monomer which has suitable refractive indices, the material being appropriately orientated and cured or fixed to form a solid stable film. The film may, for example, comprise a layer of uniaxially oriented liquid crystal polymers or a layer of cross-linked liquid crystal polymers. It is understood that a film thickness of several microns would be adequate to produce the device. By using suitable lamination techniques, the reflector may be laminated to the light pipe 12 using the material which, when cured, forms the anisotropic layer 16 to adhere the reflector to the light pipe 12. In this case, an alignment layer is applied to both the reflector 18 and the light pipe 12 in order to cause the liquid crystal to align in the appropriate direction. Depending upon the liquid crystal, heat or ultraviolet light may be used to fix the properties of the liquid crystal layer.

The first and second retarders 20, 22 may also be fabricated using liquid crystal polymers which have been provided on the appropriate surfaces, aligned in the desired directions and fixed to form stable films. Suitable techniques for aligning the liquid crystal polymers include providing suitably rubbed alignment surfaces, or providing alignment surfaces which are coated with an alignment layer which is subsequently rubbed. The thickness of the films forming the first and second retarders 20, 22 is chosen to provide the required optical retardation.

Figure 2:
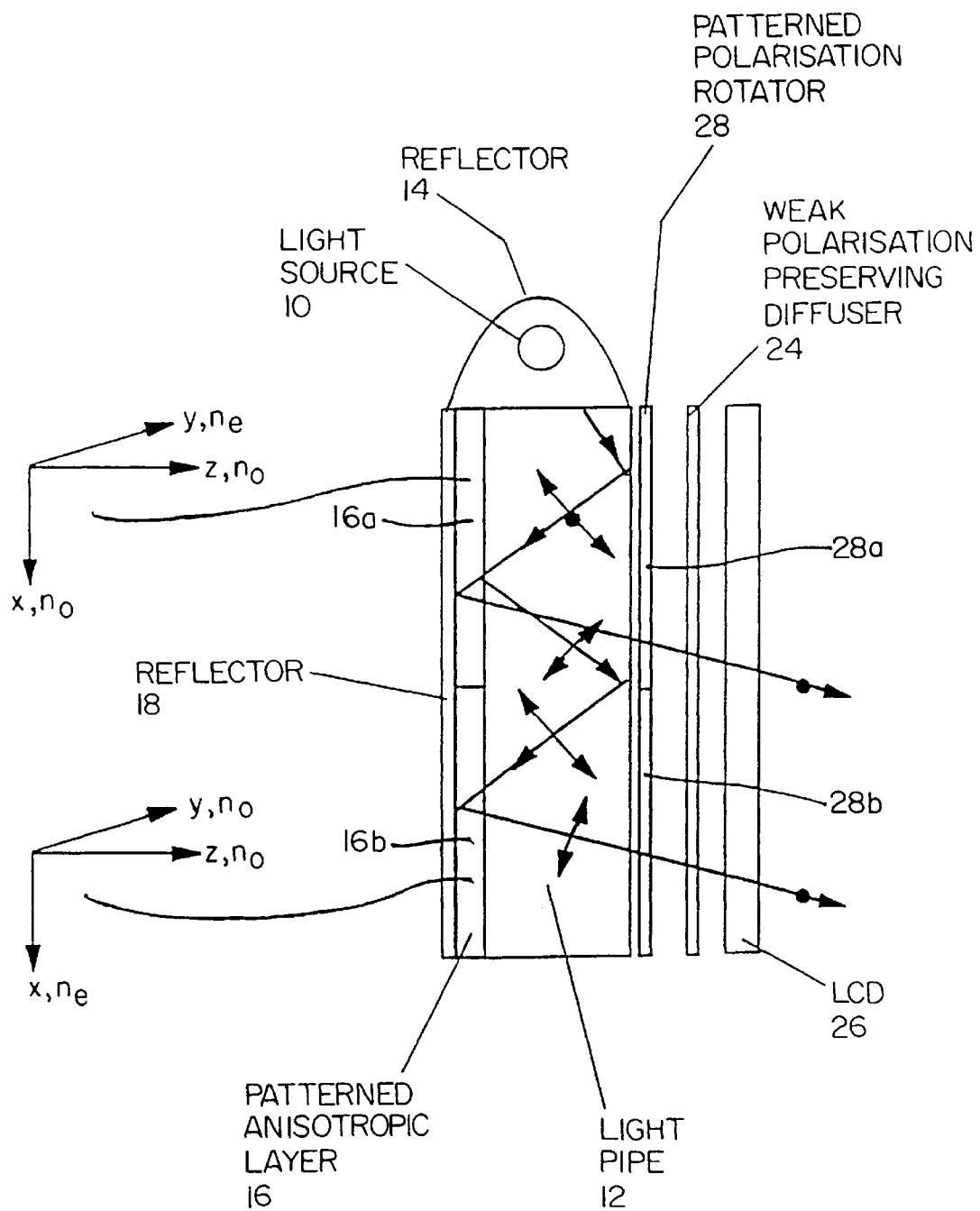
FIG. 2 is a diagrammatic view of an illuminator constituting a second embodiment of the invention.

The embodiment illustrated is FIG. 2 is similar to that illustrated in FIG. 1 but includes a patterned anisotropic layer 16 having first and second regions 16a and 16 b. The first regions 16a reflect the polarization components denoted by the double-headed arrow and transmit the orthogonally polarised components. The second regions 16b have refractive indices arranged such that the components denoted by the double-headed arrow are transmitted at the interface between the light pipe 12 and the anisotropic layer 16 whereas the orthogonally polarised components are reflected.

The illuminator further comprises a patterned polarization rotator or retarder 28 including regions 28a which do not rotate the direction of polarization of the light incident thereon, and regions 28b which are arranged to rotate the direction of polarization such that light of the second polarization components denoted by the double-headed arrow in FIG. 2 incident upon the regions 28b of the patterned polarization rotator 28 is converted to the components denoted by the dot in FIG. 2.

As illustrated in FIG. 2, the polarization component denoted by a dot is transmitted at the boundary between the light pipe 12 and the region 16a of the anisotropic material 16, and reflected by the reflector 18 through the region 28a of the polarization rotator 28. Since the region 28a has no effect upon the polarization of light incident thereon, light of crystal display 26.

The polarization component denoted by the double headed arrow in FIG. 2 is reflected at the boundary between the region 16a of the anisotropic layer 16 and the light pipe 12 and after one or more subsequent reflections, is incident upon the region 16b where it is transmitted to the reflector 18. The reflector 18 reflects the component out of the light pipe 12 through the region 28b of the polarization rotator 28 which rotates the polarization of the component to match that of the component denoted by the dot in FIG. 2.

Substantially all of the light emitted by the illuminator illustrated in FIG. 2 is of uniform polarization. Also, substantially all of the light from the light source 10 is transmitted by the illuminator, so that substantially no light is absorbed. Such an arrangement is therefore suitable for illuminating the liquid crystal display 26.

U.S. Pat. No. 5,303,322 describes an arrangement whereby a lightpipe is provided with one or more thin films which permits the angular intensity distribution of the light pipe to be controlled. The arrangement of the present invention could be used in conjunction with such a lightpipe in order to provide a lightpipe having a polarized output of controlled angular intensity distribution.

In the preceding description, only light beams propagating in the plane of the paper have been described whereas, in a practical embodiment, light beams propagating at angles to the plane of the paper would also exist.

A computer simulation of an arrangement similar to that of the first embodiment has been carried out, the simulation relating to an arrangement comprising a polycarbonate light guide of refractive index 1.58 coated with a uniaxial anisotropic layer (for example a liquid crystal polymer film) having its optic axis extending perpendicularly to the plane of the paper if the light guide is oriented as illustrated in FIG. 1. The anisotropic layer has an extraordinary refractive index of 1.58 and an ordinary refractive index of 1.48.

Figure 3:
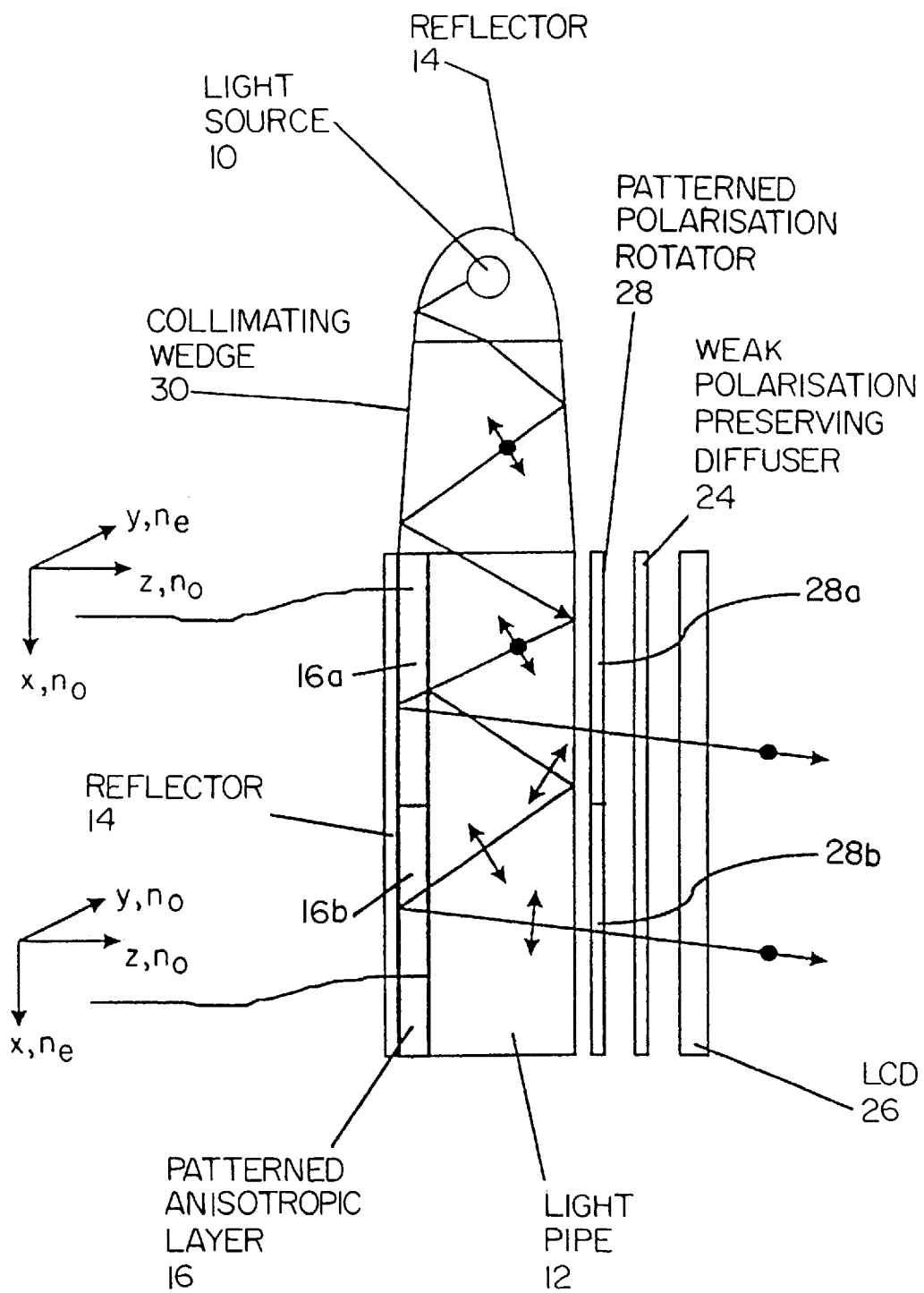
FIG. 3 is a view of a modification to the illuminator of FIG. 2.

In the simulation, the angles of the light rays entering the light guide are restricted so that the maximum grazing angle of light within the light guide at the interface between the light guide and the anisotropic layer is limited to 20°. Such a distribution of light was created using an arrangement as illustrated in FIG. 3 using a fluorescent lamp 10, a parabolic reflector 14 and a collimating wedge 30. The fluorescent lamp was modelled as being arranged to emit light of random polarization randomly in all directions.

The simulation simulates the effect of light propagating both in a direction parallel to the plane of the paper when the light guide is oriented as in FIG. 1, and in other directions into and out of the plane of the paper. The simulation showed that light transmitted into the anisotropic layer was polarized in the x-y plane with the polarisation being mainly in the y-direction (with x and y being the directions indicated in FIG. 1, y extending perpendicularly to the plane of the paper). The ratio of the intensities of the light polarised in the y and x directions was found to be approximately 15:1, the equivalent ratio for a conventional light guide being 1:1.

What is claimed is:

1. An illuminator comprising:
   a light guide having a first surface and a second surface;
   a reflector arranged to reflect light, which has passed through the light guide and out of the first surface, through the first surface, the light guide and the second surface; and
   a first anisotropic layer disposed in contact with the first surface and between the light guide and the reflector for separating substantially all of a first polarization state from a second polarization state orthogonal to the first state, the first anisotropic layer having a first refractive index which is substantially equal to or greater than a refractive index of the light guide and a second refractive index which is less than the refractive index of the light guide.

2. An illuminator as claimed in claim 1, wherein the light guide exhibits anisotropic properties.

3. An illuminator as claimed in claim 1, further comprising a second layer of anisotropic material disposed adjacent the second surface and arranged to convert the polarization of light incident thereon.

4. An illuminator as claimed in claim 3, further comprising a third layer of anisotropic material disposed adjacent the second layer and arranged to return light transmitted by the second layer to its original polarization.

5. An illuminator as claimed in claim 4, wherein at least one of the first, second and third layers comprises at least one uniaxially oriented polymer layer.

6. An illuminator as claimed in claim 5, wherein the at least one polymer layer comprises a liquid crystal layer.

7. An illuminator as claimed in claim 5, wherein the at least one polymer layer is formed of a cured liquid crystal monomer composition.

8. An illuminator as claimed in claim 7, wherein the at least one polymer layer has been cured or cross-linked by irradiation with ultraviolet radiation.

9. An illuminator as claimed in claim 5, wherein the at least one polymer layer is formed of a cured liquid crystal polymer.

10. An illuminator as claimed in claim 9, wherein the at least one polymer layer has been cured or cross-linked by irradiation with ultraviolet radiation.

11. An illuminator as claimed in claim 3, wherein the second layer comprises a quarter wave plate.

12. An illuminator as claimed in claim 1, wherein the first layer is patterned so as to comprise at least one first region arranged to transmit substantially all light of a third polarization state and at least one second region arranged to transmit substantially all light of a fourth polarization state orthogonal to the third polarization state.

13. An illuminator as claimed in claim 12, further comprising polarization adjusting means for converting light of the fourth polarization state to light of the third polarization state.

14. An illuminator as claimed in claim 13, wherein the polarization adjusting means includes at least one first region arranged to transmit light without altering its polarization and at least one second region arranged to convert the polarization of the light incident thereon to the orthogonal polarization.

15. An illuminator as claimed in claim 1, wherein the reflector and the first layer are laminated to the light guide.

16. An illuminator as claimed in claim 1, further comprising means for limiting a maximum grazing angle at which light enters the light guide.

17. An illuminator as claimed in claim 16, wherein the limiting means comprises an input wedge.

* * * * *